Aug. 8, 1944.  F. A. HOWARD  2,355,218
PROPULSIVE UNIT
Filed Dec. 23, 1940  3 Sheets-Sheet 2

Frank A. Howard Inventor
By P. L. Young Attorney

Patented Aug. 8, 1944

2,355,218

UNITED STATES PATENT OFFICE 2,355,218

PROPULSIVE UNIT

Frank A. Howard, Elizabeth, N. J.

Application April 2, 1938, Serial No. 199,551, which is a division of application Serial No. 650,018, January 3, 1933. Divided and this application December 23, 1940, Serial No. 371,461

2 Claims. (Cl. 123—1)

This invention relates to a propulsive unit which includes an internal combustion engine and a liquid coupling for transmitting the power of the engine to the load, and means for circulating lubricating liquid from the engine through the coupling where it is cooled, and then back to the engine.

In order to show the range of practical application of the invention, it has been illustrated primarily in the form of a complete rotary power unit comprising a two-cycle rotary internal combustion engine and a rotary oil clutch or coupling through which the power is transmitted from the engine to the load or from the load to the engine for braking action. Other types of engine, such as a steam engine or a reciprocating piston type of internal combustion engine, can be used if desired and some of the advantages of the invention will be retained.

In the rotary engine, the power is transmitted directly to or from a crankshaft by a moving chamber wall in the form of a rotating ring called the rotor journaled on the crank-pin, this moving wall being supplemented by partition walls called vanes which also move, but only by reciprocating in their own planes and therefore against frictional resistance alone. In the kinematic design of general utility, the positive motion of the rotor is that of an eccentric strap with infinitely long connection rod, but in addition to this positive motion it is free to slip or drift by rotation on its own axis under unbalanced frictional forces, such drift being immaterial to its displacement motion but of great practical importance. The motion of the vanes is one of rectilinear reciprocation in planes parallel with their surfaces exposed to the working fluid. In a modified design of more limited utility the rotor motion is that of an eccentric strap with connecting rod or arm of variable finite length, and the arm itself serves as the partition wall or vane.

Figure 1:
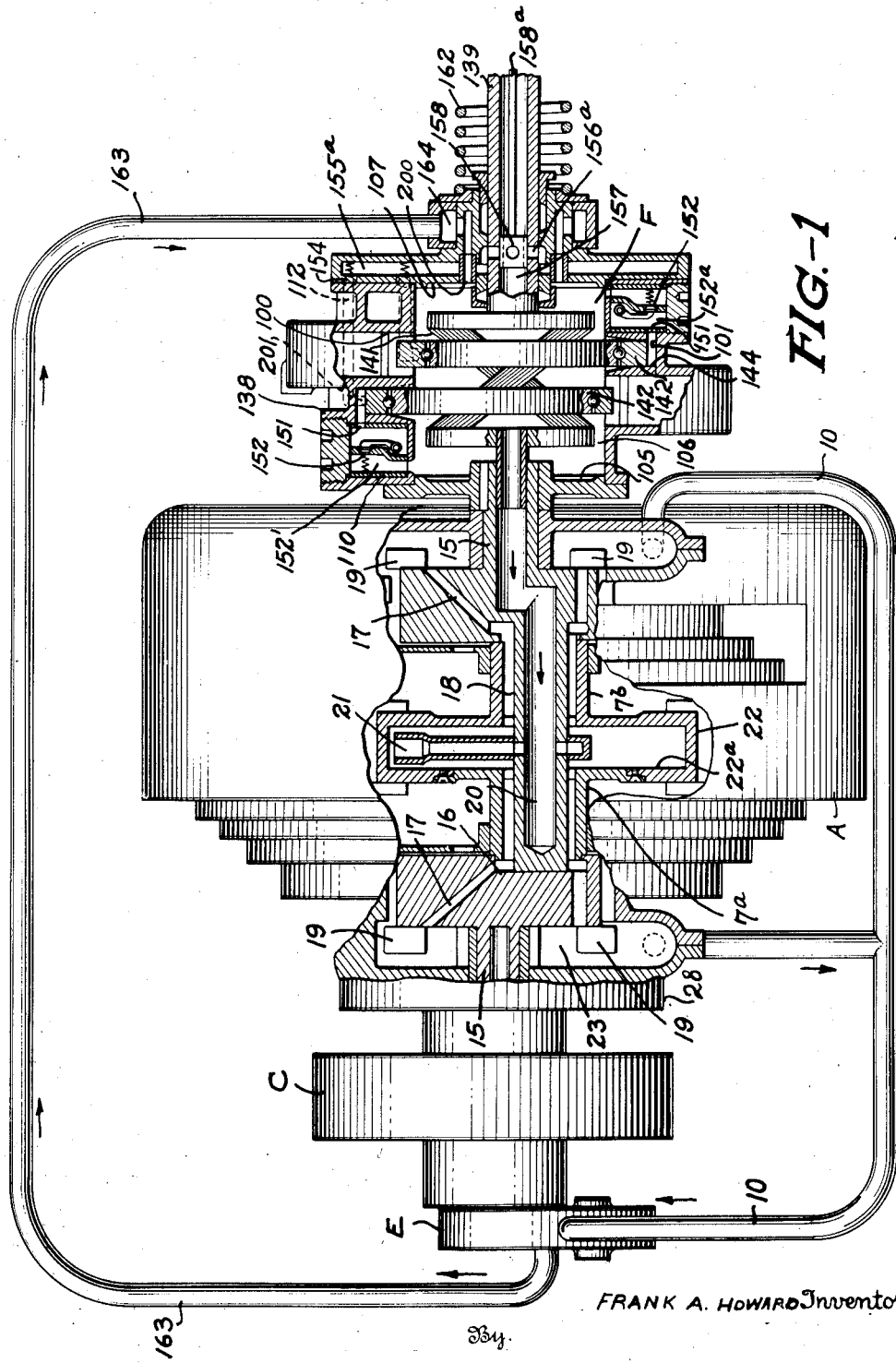

The invention will be fully understood from the following description, taken in connection with the drawings, in which Figure 1 is a side elevational view with parts broken away of the internal combustion engine and the rotary oil clutch showing the circulation of oil therethrough.

Figure 2:
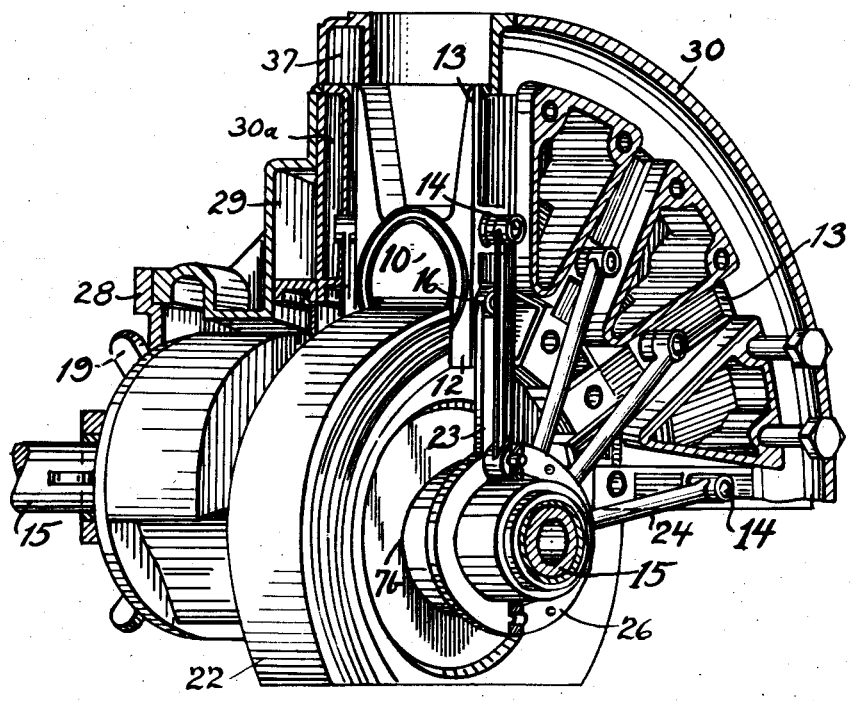
Figure 3:
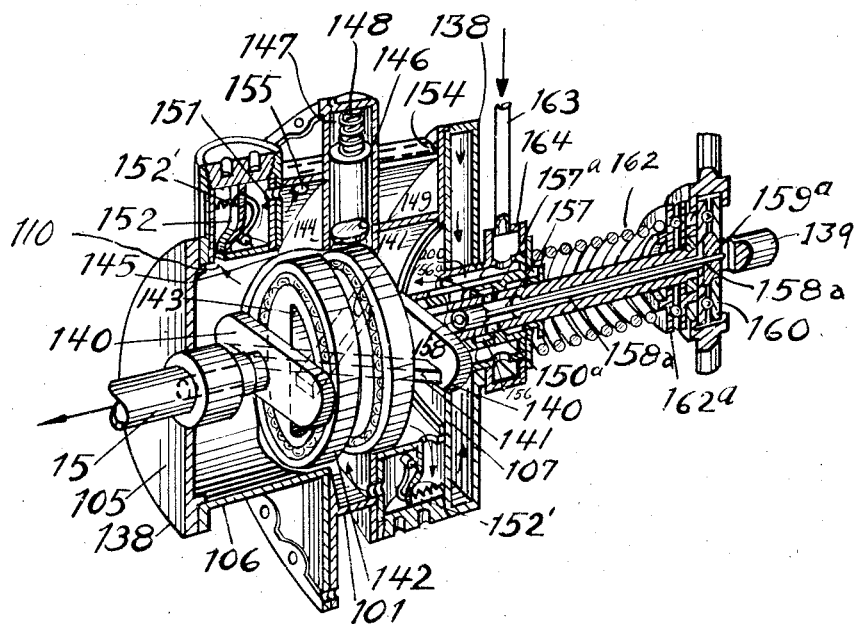

Fig. 2 is a perspective view of the general organization of the engine showing the arrangement of the master rod and link rods; and Fig. 3 is a perspective view of the clutch mechanism with the clutch disengaged.

This application is a division of my copending application Serial No. 199,551, entiltled "Rotary clutch," filed April 2, 1938, now U. S. Patent No. 2,253,299, which in turn is a division of my application filed January 3, 1933, which matured into U. S. Patent No. 2,112,844, issued April 5, 1938, entitled "Rotary engine."

Referring now to the drawings, there is illustrated a two-cycle rotary internal combustion engine A, equipped with a rotary compressor C taking a small proportion of highly carburetted air from a carburation system (not shown) and delivering it under pressure to the engine A, and an oil circulating pump E receiving the lubricating and cooling oil scavenged from the engine through conduit 10 and delivering the same under pressure through a conduit 163 to a rotary oil clutch F which serves also by virtue of its rotation in free air as an oil cooler, thence to the crank shaft of the engine, back to the engine. Thus the engine oil is used for both lubricating and cooling and power transmission.

The engine construction comprises a crank shaft designated 15 which is a single throw counterbalanced split shaft of the general type used in radial engines. The main drive is taken from the right hand end as viewed in Figure 1, with which there is integrally forged the right counterweight and the crank pin 18, both crank shaft 15 and crank pin 18 being hollow to provide for introduction of cooling and lubricating oil.

The left hand end of the crank pin 18, as viewed in Figure 1, is secured to the integral cheek of the right hand end of the shaft 15. The opposed faces of the cheeks of the crank throws of the shaft have grooves 16 turned in them surrounding the crank pin and communicating with bores 17 through the counterweights. These grooves and radially inclined bores serve as centrifugal pumps to collect and discharge the oil fed in through the bore 20 of the crank shaft.

Radial flanges 19 fixed to the outer faces of the counterweights and crank throws act as the impellers of centrifugal scavenging pumps, as will later appear. A radial discharge nozzle 21 for cooling oil, removably attached to the center of the crank pin and communicating with its bore through radial ports, completes the crank shaft assembly.

The rotor 22 of the engine is in the form of a hollow cylinder with hubs 7a and 7b extending the length of the crank pin 18 and with the end casings 28 constituting the crank case. The interior of the rotor 22 is hollow, constituting an annular recess at 22a.

The rotor is internally cooled by lubricating oil supplied by the nozzle 21. Special provision must be made to effect satisfactory cooling with this medium. The requirement to be met is that oil must be supplied at an adequate rate to limit the average temperature rise, and that there must be high velocity, turbulent circulation over the surfaces to be cooled. The first requirement is met by providing a circulating pump E of adequate capacity and appropriately large delivery passages. The second requirement is met by extending the delivery nozzle 21 out to the inner periphery of the annular recess 22a of the rotor, as shown in the figure, and by making it wide enough to act as an effective impeller. Since this nozzle is fastened to, and rotates with, the crank shaft, while the rotor itself has no definite motion of rotation with respect to the casing, the nozzle acts as an impeller to circulate the entire body of oil around within the rotor at crank shaft speed.

The incoming fresh oil discharged from the fluid clutch by means of the communicating bore 20 in the engine crank shaft and the nozzle 21 is delivered at the periphery of the nozzle 21 under pump pressure and forced out at the center through the grooves in the outer faces of the bearing bushings of the rotor pump. Centrifugal force plays no part in the supply of the cooling oil or its internal circulation, both being positive displacement actions varying directly with engine speed. Centrifugal action is relied upon, however, to remove the oil from the collecting grooves 16 at a rate in excess of its supply to prevent the building up of a pressure in these grooves and also for scavenging the compartments in the end casings 23 into which not only the cooling oil, but also the lubricating oil flowing through the main bearings and rotor bearings collects.

The engine A is formed of an engine casing 30 which is of annular shape forming a parallel-sided chamber with water cooled side and outer peripheral walls and of such width as to give only a working clearance for the rotor 22 which thus forms the inner movable peripheral wall of the complete annular chamber and transmits power from the crankshaft to the working fluid or vice versa. The side water jackets 30a extend radially inward over a portion only of the side walls. An outer section 28 of the casing 30 carries the main bearings and forms the outer halves of the centrifugal pump casing for the oil scavenging pumps of which the runners are the flanges 19. An intermediate section 29 forms the remainder of the pump casings and the casings of the rotary blowers. An air duct 37 encircles the casing.

The complete annular chamber formed by the casing 30 and rotor 22 is sub-divided into twelve working chambers by the vanes 10. The vanes 10 have rectangular central portions with depending rectangular legs 12 which straddle the rotor 22 and extended arms 13 which are required in this form of the design to seal against leakage the casing slots through which the link bearing bosses 14 project. To accommodate the vanes the casing 30 is provided with radial channels and slots which serve as slide channels for the vanes. The vanes 10 form fluid-tight partitions across the space between the rotor 22 and the casing. The vanes 10 are guided in the casing for reciprocation therein. They are connected to the crank pin 15 by connecting rods 24 of a length equal to the rotor radius to cause positive reciprocation of each vane 10 by rotation of the crank pin 15. Each vane is connected to the crank pin as follows:

A plate 26 is freely mounted upon the crank pin 15 and the connecting rods 24 are pivoted to the plate at 25 and are pivoted to the vanes 10 at 14. A master rod 23 is pivotally connected to one of the vanes at 16 and is enlarged at its opposite end to encircle the crank pin 15. The link rods 24 and the master rod 23 are of the same length and parallel to each other, whereby oscillation of the plate is prevented.

The rotary clutch includes a casing designated 138 which is the driving member in ordinary service, although the mechanism is fully reversible. The driven member is a shaft 139 passing through a stuffing box and bearing in one end of the casing 138 and having a pilot bearing in the other end of the casing. Within the casing the shaft is divided to form a plurality of cam surfaces 141 to control the radial position of twin rotors or cylindrical pistons 142. The pistons 142 are formed as annular ball bearings, the inner race of each being carried by one of the cams which passes through an inclined splined hole therein.

Each of the rotors 142 operates in a separate chamber of the casing 138, the two chambers being separated by a common wall 144. Each working chamber comprising an annular wall 101 and side walls 144 and 100 is subdivided into compartments by vanes (not shown). For admission of the working fluid to the working chambers, the latter have liberal inlet ports 151 in their outer side faces. The crank case of the clutch is constituted by the walls 105, 106 and 107. The fluid is supplied from the crank case to the ports 151 through passages 110 in the wall 101 and automatic inlet valves 152, carried in cages 152'. From valves 152 the fluid flows through the ports 151 to the working chambers. Outlet passages 112 lead from the working chambers through passages 155a to communicate with radial ports 156a opening into a central bore 157 and thus opening to the crank case. To control flow of oil from the outlet ports to the crank case through the ducts described, there is provided a plunger valve 158 in the bore 157 and having a stem 158a which passes outward through the shaft 139 to a point of attachment to valve actuating means. It will be clearly seen from the above description that the driving shaft is the shaft 15. This shaft is keyed to the casing or housing 138 and turns with it as one piece. The driven shaft 139 is actuated through the medium of oil in the above mentioned compartments which drive the twin rotors 142 in rotation, transmitting the rotary movement to the shaft 139 through the above mentioned cams.

The clutch is normally held in the fully disengaged position shown in the figure by a spring 162. Fluid may be supplied continuously to and through the clutch casing 138 by a conduit 163 which enters a hollow gland 164 riding on a boss on the face of the casing and communicating with the crank case of the clutch through the ducts 200. From the crank case of the clutch, the fluid is discharged through the bore 20 in the driving shaft as previously described.

In the fully engaged position, operation of the clutch is as follows:

The rotation of the casing 138 applies a torque to the shaft 139 through the oil contained in the working chambers, then in their compression phase. The lever arm or effective crank throw of each rotor is the amount of its eccentricity. Leakage is replaced during the expansion phase of the slippage movement of the rotors by oil admitted from the crank case through the inlet valves 152, this delivery being assisted by centrifugal force.

The direction of oil flow through the clutch and engine is as indicated by the arrows in the figure. It will be be seen that the oil is delivered from the crank case of the engine through the lines 10 and pump E through the line 163 and enters the clutch mechanism through the hollow gland 164 by means of passageways 200. This oil is delivered from the crank case of the clutch mechanism through the bore of the crank 15 and the bore 20 of the crank pin 18, then radially outwardly through the discharge nozzle 21 into the crank case of the engine whence it is recycled through the lines 10 as above described.

The oil circulates through the clutch mechanism as follows: It flows from the crank case of the clutch through the passages 110 past the automatic inlet valves 152 through passages 210 into the respective compartments previously described. The driving power is transmitted through the oil in these compartments from the rotary casing 138 to the rotors 142 and thence to the driven shaft 139. Escape of this trapped oil in the compartments is permitted when the clutch is to be disengaged. This is effected by withdrawing the valve 158 laterally to the right as illustrated in the figure. The oil then flows from the compartments past the valves 154 and outwardly through the bore 157 as indicated by the arrows, thus effecting return of the oil to the crank case of the clutch mechanism.

The rotors 142 are in their position of extreme eccentricity in Fig. 1. In this position the maximum driving force is transmitted from the driving shaft 15 through the fluid in the working chambers to the driven shaft 139 since the fluid is considered to be an incompressible fluid. In this position the T-head 140 is in substantial engagement with the right hand wall of the casing 138. Escape of the fluid from the working chambers is prevented by means of the plunger valve 158 which is in the position shown in Fig. 1 to block the ports 156a.

The clutch can be disengaged by moving the rotors to their concentric position illustrated in Fig. 3, as will now be described. The ring 161 controls the position of the plunger valve 158 by means of a rod 158a. The ring 161 is moved to the left as viewed in Fig. 3 to the position shown in Fig. 3 in which the plunger valve which is of hollow construction is disposed to the left of the ports 156a to permit free passage of the trapped fluid from the working chambers through the passages 112, 155a, ports 156a and bore 157 into the crankcase of the clutch. A ring 162a which controls the longitudinal position of the driven shaft 139 is now moved to the left as viewed in Fig. 3 until the T-head 140 substantially abuts against the left hand wall 105 of the casing 138. This is the position illustrated in Fig. 3. Passage of the bars 141 through the inclined holes of the rotors 142 has retracted the rotors to their concentric position. Additional escape of fluid from the working chambers to facilitate the shifting of the position of the rotors is facilitated by the leakage grooves 145 provided in the walls of the working chambers.

To shift now from the concentric position of the rotors 142 illustrated in Fig. 3 to the extreme eccentric position of the rotors illustrated in Fig. 1, and assuming that the plunger valve 153 is still in its position to the left of the ports 156a to permit free flow of fluid from the working chambers, the spring is permitted to press the collar 162a to the right as viewed in Fig. 3. The pressure of the spring 162 moves the driven shaft 139 to the right until the T-head 140 is in substantial abutment against the right hand wall of the chamber 138. This movement of the driven shaft 139 with the bars 141 affixed thereto moves the rotors 142 outward to the extreme eccentric position illustrated in Fig. 1. The collar 161 is now moved to the right as viewed in Fig. 3, thereby positioning the plunger valve 158 to cut off escape of the fluid trapped in the working chambers. Full driving force can now be transmitted from the driving shaft and casing 138 through the fluid in the working chambers to the driven shaft 139.

The rotary power unit shown is particularly adapted to automotive vehicles by reason of its compactness, high and constant torque, vibrationless and silent operation and relatively high power to weight ratio. In such uses the hydraulic clutch permits of indefinitely extended controllable slippage with full and continuous torque transmittal at all slippage ratios. This in turn permits of the substitution of an emergency low speed and a reverse gear for the variable speed transmissions now employed in automobiles, the increase of driving torque and higher motor speeds gained from such transmissions being not required with the rotary engine. The permissible rotation speed of the latter as well as its torque is so high that under its normal or direct drive gear ratio it delivers the maximum torque required for ordinary starting, acceleration, hill climbing and all that it is safe or advantageous to transmit with average traction conditions through driving wheels carrying only half of the weight of the vehicle. The rotary unit comprising both engine and clutch is therefore a new propulsive entity, replacing in the largest single field of service not only the reciprocating engine and friction clutch, but also the variable speed transmission necessarily associated therewith.

It is my purpose to claim in the appended claims all of the novel subject matter here disclosed as broadly as is permissible in view of the prior art.

I claim:

1. A propulsive unit comprising an engine crank case, an internal combustion engine associated with the crank case and having a drive shaft protruding exteriorly from the side wall of the crank case, a lubricating system for the engine discharging into the crank case, a fluid clutch casing carried by the drive shaft, a conduit for lubricating oil leading from the engine crank case to the clutch casing for conducting all of the oil from the crank case to the clutch casing, fluid clutch mechanism in the casing adapted to receive oil from the casing for transmission through the clutch mechanism and back into the casing, and a conduit for the lubricating oil leading from the casing directly to the intake of the engine lubricating system for conducting all of the oil from the clutch to the lubricating system of the engine whereby complete flow of oil through the lubricating system and clutch casing is effected in series.

2. A propulsive unit comprising an engine crank case, an internal combustion engine associated with the crank case and having a drive shaft protruding exteriorly from the side wall of the crank case, a lubricating system for the engine discharging into the crank case, a fluid clutch casing carried by the drive shaft for rotation with the drive shaft, the casing being disposed exteriorly of the engine crank case and unhoused whereby, by rotating in free air, the oil is cooled, a conduit for lubricating oil leading from the engine crank case to the clutch casing for conducting all of the oil from the crank case to the clutch casing, fluid clutch mechanism in the casing adapted to receive oil from the casing for transmission through the clutch mechanism and back into the casing, and a conduit for the lubricating oil leading from the casing directly to the intake of the engine lubricating system for conducting all of the oil from the clutch to the lubricating system whereby complete flow of oil through the lubricating system and clutch casing is effected in series.

FRANK A. HOWARD.